US009597998B2

United States Patent
Ovenshire et al.

(10) Patent No.: US 9,597,998 B2
(45) Date of Patent: Mar. 21, 2017

(54) LIGHT ASSEMBLY WITH ILLUMINABLE OUTER LENS

(71) Applicant: GM GLOBAL TECHNOLOGY OPERATIONS LLC, Detroit, MI (US)

(72) Inventors: Jay H. Ovenshire, Rochester, MI (US); Daniel E. Schmeckpeper, Clarkson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 7 days.

(21) Appl. No.: 14/739,324

(22) Filed: Jun. 15, 2015

(65) Prior Publication Data

US 2016/0362042 A1 Dec. 15, 2016

(51) Int. Cl.
| | |
|---|---|
| *B60N 99/00* | (2006.01) |
| *B60Q 1/076* | (2006.01) |
| *F21S 8/10* | (2006.01) |
| *B60Q 1/00* | (2006.01) |
| *B62D 25/12* | (2006.01) |
| *B60Q 1/04* | (2006.01) |
| *F21Y 101/02* | (2006.01) |

(52) U.S. Cl.
CPC ........... *B60Q 1/076* (2013.01); *B60Q 1/0076* (2013.01); *B60Q 1/0408* (2013.01); *B62D 25/12* (2013.01); *F21S 48/1154* (2013.01); *F21S 48/1225* (2013.01); *F21S 48/1241* (2013.01); *F21S 48/145* (2013.01); *F21Y 2101/02* (2013.01)

(58) Field of Classification Search
CPC .... B60Q 1/076; B60Q 1/0076; B60Q 1/0408; B62D 25/12; F21S 48/1154; F21S 48/1241; F21S 48/145; F21Y 2101/02
See application file for complete search history.

(56) References Cited

U.S. PATENT DOCUMENTS

| | | | |
|---|---|---|---|
| 8,820,992 B2 * | 9/2014 | Wilson | F21S 48/15 362/511 |
| 8,950,918 B2 * | 2/2015 | Langkabel | B60Q 1/04 362/294 |
| 2002/0077430 A1 | 6/2002 | Zimmerman | |
| 2016/0144900 A1 * | 5/2016 | Fortin | B60R 19/023 296/193.1 |
| 2016/0167715 A1 * | 6/2016 | Kosuge | B62D 25/10 296/181.1 |
| 2016/0185275 A1 * | 6/2016 | Kawashiri | B60Q 1/04 362/549 |

* cited by examiner

*Primary Examiner* — Lori L Lyjak

(74) *Attorney, Agent, or Firm* — Quinn Law Group, PLLC

(57) ABSTRACT

A light assembly includes a housing defining separate first and second cavities, an illuminable outer lens constructed from a homogenous multi-polymer material, and a first lighting source within the first cavity. A second lighting source may be positioned in the second cavity. An opaque portion of the housing separates the first and second cavities and prevents an influx into the second cavity of light emitted by the first lighting source. The multi-polymer material, when irradiated by the first lighting source, illuminates with a light transmittance level of about 50% or more and a haze level of less than about 30%. A vehicle includes a body having a front end, a hood positioned at the front end, and the light assembly positioned adjacent to the hood. A controller may transmit a lighting control signal to the first lighting source to command a turn signal, daytime running light, park, or position function.

17 Claims, 2 Drawing Sheets

LIGHT ASSEMBLY WITH ILLUMINABLE OUTER LENS

TECHNICAL FIELD

The disclosure relates to a light assembly having an illuminable outer lens.

BACKGROUND

Light assemblies may be configured to provide a single lighting function, such as task lighting, accent lighting, and the like, or to provide several different lighting functions. For example, a vehicle headlight assembly can provide high-beam and low-beam functions in addition to a daytime running light (DRL) function and a position lighting function. The high-beams and low-beams of a headlight assembly illuminate a roadway ahead of the vehicle to enhance overall roadway visibility. The DRL function and the position lighting function of the same headlight assembly provide lighting that improves visibility of the vehicle to pedestrians and oncoming traffic. While the various lighting functions may be housed together in a common housing, the power requirements and other light qualities of the different lighting functions may vary.

SUMMARY

A light assembly is disclosed herein that includes a housing, an illuminable outer lens, and a lighting source. The housing, which includes an opaque portion such as a wall of black or chrome-plated plastic, at least partially defines first and second cavities. The first lighting source is positioned within the first cavity. A second lighting source may be positioned in the second cavity. The illuminable outer lens is constructed from a transparent, homogenous multi-polymer material. The opaque portion of the housing separates the first cavity from the second cavity and prevents an influx into the second cavity of light emitted by the first lighting source. The multi-polymer material, when irradiated by light from the first lighting source, is configured to illuminate in a particular embodiment with a light transmittance level of at least about 50% and a haze level of not more than about 30%.

To achieve the desired lighting effect, the multi-polymer material may include a mixture of polycarbonate and polyetheresteramide (PEEA), with the PEEA constituting less than 1% of the illuminable outer lens by weight. In another embodiment, the PEEA constitutes less than about 0.2% of the illuminable outer lens by weight.

The first lighting source may include a plurality of light-emitting diodes, for instance arranged in an LED light pipe or on a printed circuit board.

A controller may be programmed to transmit a lighting control signal to the first lighting device to command activation of the first lighting source, and to thereby request a corresponding lighting function, e.g., a turn signal function, a Daytime Running Light (DRL) function, a park function, and/or a position function depending in an example vehicular lighting design.

The light assembly may be configured for use as a vehicle headlight assembly in a particular embodiment, with a second lighting source in the form of a low-beam/high-beam portion of the vehicle headlight assembly positioned within the second cavity.

A vehicle is also disclosed that includes a body, a hood, and the light assembly noted above. The light assembly is positioned adjacent to the hood in this particular embodiment such that the light assembly acts as a vehicle headlight assembly.

The above features and advantages and other features and advantages of the present disclosure are readily apparent from the following detailed description of the best modes for carrying out the disclosure when taken in connection with the accompanying drawings.

DETAILED DESCRIPTION

Figure 1:
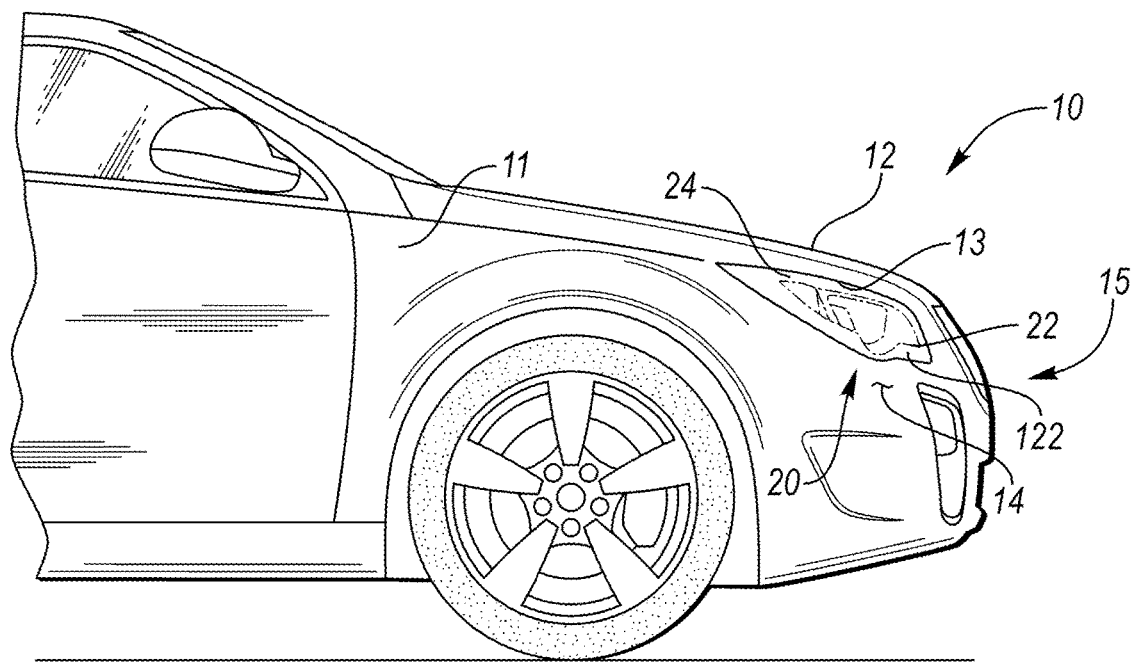
FIG. 1 is a schematic side view illustration of a light assembly with an illuminable outer lens as forth herein used in an example vehicle application.
Figure 2:
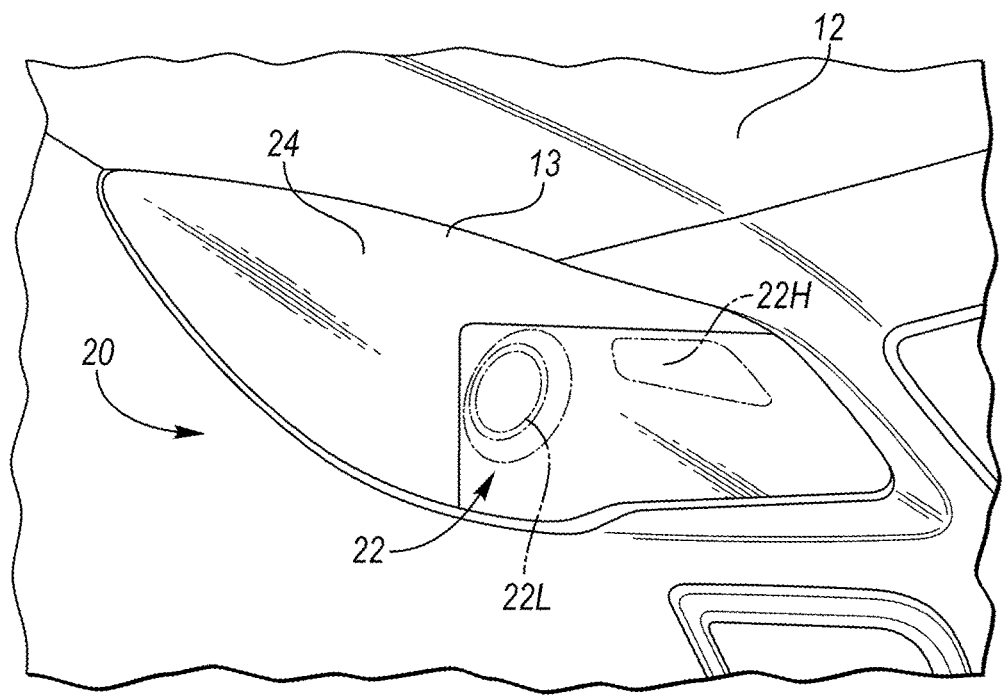
FIG. 2 is a schematic perspective front view illustration of the light assembly shown in FIG. 1.

Referring to the Figures, wherein like numerals indicate like parts throughout the several views, a system in the form of an example vehicle 10 is depicted in FIG. 1. The vehicle 10 has a body 11 and a hood, with the hood 12 positioned proximate to a front end 15 of the vehicle 10. The vehicle 10 may include a light assembly 20 of the type described in detail herein. The light assembly 20 includes an illuminable outer lens 24 as described in further detail below with reference to FIGS. 2 and 3. The light assembly 20 may be configured for use adjacent to the hood 12 as part of an example headlight assembly as shown in FIGS. 1 and 2, and may be shaped in any desirable fashion to present the desired aesthetic appearance. Alternatively, the light assembly 20 may be used at other locations of the vehicle 10, for instance in a tail light assembly (not shown) to provide backup indication or other suitable illumination.

While the vehicle 10 of FIG. 1 is a typical example application suitable for the light assembly 20, the present design is not limited to vehicular applications. Any stationary or mobile object requiring lighting may benefit from use of the present design, when properly scaled and configured for the particular application. That is, the lighting assembly 20 may enjoy use in various single-function or multi-function lighting applications, e.g., in commercial or residential buildings, display illumination, appliance illumination, accent lighting, and any other application in which the disclosed lighting effects are desirable. For illustrative consistency, the vehicle 10 will be described hereinafter as an example system without limiting use of the lighting system 20 to such an embodiment.

In addition to housing any conventional low-beam and high-beam lighting functions, with low-beam and high-beam headlights shown generally at 22 in FIGS. 1 and 2 and covered by a separate outer lens 122 of conventional construction, the light assembly 20 in the embodiment of FIGS. 1 and 2 may be configured to provide a position light function and a daytime running light (DRL) function, all of which are described generally above and known in the art. Use of the illuminable outer lens 24 is intended to enable wider ranges of possible lighting effects, such as by extending lighting functions into areas of the light assembly 20 typically occupied by a bezel and/or chrome or reflective trim pieces.

In particular, the illuminable outer lens 24 of the present design may be constructed from a transparent, homogenous multi-polymer material such that the material of the illuminable outer lens 24 appears to light up or glow with a predetermined threshold level of light transmittance and haze while also transmitting light for predetermined lighting functions, e.g., the DRL function outside of conventional low-beam/high-beam functions. As described with reference to FIG. 3 below, the light assembly 20 may be specially constructed such that light used for functions other than high-beam or low-beam lighting is blocked from entering a cavity housing such high-beam and low-beam lighting functions.

Figure 3:
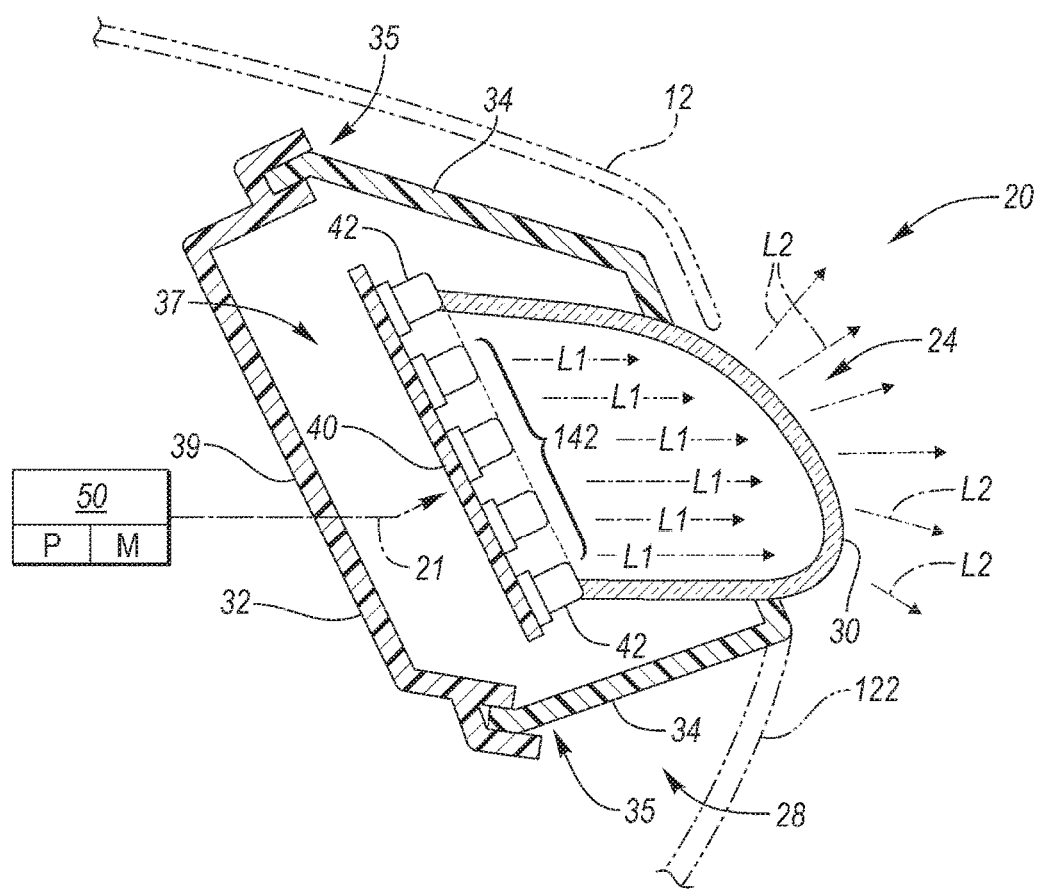
FIG. 3 is a schematic cross-sectional view illustration of a light assembly that can be used in the example vehicle of FIG. 1 and in other possible lighting applications.

As shown in FIGS. 1 and 3, the light assembly 20 may be positioned between the hood 12 and a front fascia piece 14 of the vehicle 10. When the hood 12 is closed as shown, an edge 13 of the hood 12 may align with the light assembly 20 and mask portions of the light assembly 20 as explained below with reference to FIG. 3. Thus, the light assembly 20 may enable a wider range of possible functional or aesthetic lighting effects, or headlight designs, by taking advantage of the typically unused area between any structure providing the low-beam/high-beam functions and the edge 13.

FIG. 2 depicts the light assembly 20 of FIG. 1 when configured as a non-limiting example headlight assembly. The headlights shown generally at 22 include a separate low-beam headlight 22L and high-beam headlight 22H of the types well known in the art. The illuminable outer lens 24 in this embodiment extends from the headlights 22 to the edge 13 of the hood 12. Thus, light emitted by the low-beam and high-beam headlights 22L and 22H does not pass through the illuminable lens 24, and any light emitted within a cavity covered by the illuminable lens 24 does not bleed into an adjacent cavity housing the low-beam and high-beam headlights 22L and 22H.

Referring to FIG. 3, the light assembly 20 in an example embodiment includes the illuminable outer lens 24 and a first lighting source 42. Unlike conventional designs utilizing a separate polycarbonate outer lens as a type of shield and weather seal, the illuminable outer lens 24 forms a single outer lens for the portion of the light assembly 20 containing the first lighting source 42. Additional first lighting sources 142 may be used alone or with the first lighting source 42 in alternative embodiments. The first lighting source 42 and/or 142, e.g., a plurality of light-emitting diodes (LEDs) connected to a printed circuit board 40 or arranged in an LED light pipe, is positioned adjacent to the illuminable outer lens 24 as shown such that the first lighting source 42 emits light (arrows L1) directly into the material of the illuminable outer lens 24, which ultimately illuminates the multi-polymer material of the illuminable outer lens 24 with a predetermined haze level, e.g., of no more than about 30% in a particular embodiment.

As is known in the art and used herein, the term "light transmittance" refers to the fraction of light passing through a sample, in this instance the illuminable outer lens 24, with light transmittance equal to $$\frac{I_t}{I_o},$$

with $I_t$ and $I_o$ describing light intensity after and before a beam of light passes through the sample, respectively. The term "haze level" describes cloudiness caused by light scattering due to suspended pigment or other particles. Forward light scattering or transmission haze describes the forward scattering of any incident light, in this instance the light represented by arrows L1. In the present design, a haze level of less than 30% as measured in accordance with ASTM D1003-95 is desirable to retain a substantially clear or transparent appearance of the illuminable outer lens 24 when the first lighting source 42 and/or 142 is turned off. Most of the emitted light (arrows L1) thus ultimately passes through the illuminable outer lens 24 as diffused light (arrows L2) with at least 50% of the emitted light (arrows L1) transmitted through an outer surface 30 of the illuminable outer lens 24 as the diffused light (arrow L2).

In an example embodiment, the illuminable outer lens 24 is constructed of a substantially transparent, moldable thermoplastic multi-polymer composition providing the above-noted calibrated level of light transmission and haze. For instance, the illuminable outer lens 24 may be constructed of polyetheresteramide (PEEA) constituting less than about 1% by weight of the illuminable outer lens 24. Alternatively, the PEEA may constitute less than about 0.2% by weight of the illuminable outer lens 24. The PEEA provides a calibrated level of light transmission, e.g., about 50-70%, or about 60%, with the multi-polymer mixture allowing the illuminable outer lens 24 to appear as clear and transparent to the naked eye when the first lighting source 42, 142 is de-energized, and as glowing or illuminated when the first lighting source 42, 142 is active or energized.

To facilitate manufacturing, such a multi-polymer material should be moldable in a "multi-shot" injection molding approach, as is well known in the art. While higher relative levels of PEEA may be used within the scope of the disclosure, exceeding 1% by weight of PEEA content may render the illuminable outer lens 24 less than optimal in terms of light transmittance and haze, ultimately resulting in a "milk jug-like" aesthetic quality that may not conductive to producing the desired lighting effects.

The first lighting source 42, 142 of FIG. 2 may be connected to the printed circuit board 40 and a controller 50 having a processor P and memory M. In response to the present state of the vehicle 10, e.g., an ignition on/off state, a PRNDL position, turn signal position, ambient light levels, etc., the controller 50 automatically commands a particular lighting function via transmission of lighting control signals (arrow 21) to the printed circuit board 40. The number and/or location of the first lighting sources 42, 142 illuminated in response to the lighting control signals (arrow 21) may vary with the intended design, but may include one or more of the functions noted above, i.e., position light function, DRL, parking light function, turn signal function, etc.

The light assembly 20 of FIG. 3 also includes a housing 32 having a back plate 39 and an opaque portion 34. The back plate 39 defines a first cavity 37 in conjunction with the illuminable outer lens 24 and the opaque portion 34, with the printed circuit board 40 and first lighting sources 42, 142 housed within the first cavity 37. The back plate 39 may be bolted or otherwise securely fastened to the vehicle 10 shown in FIG. 1 to install the light assembly 20, or to other structure when the light assembly 20 is used in non-vehicular applications.

A second cavity 28 is also defined by the lighting assembly 20, i.e., at least partially defined by the back plate 39 and opaque portion 34, with only part of the second cavity 28 shown in FIG. 2 for illustrative simplicity. Low-beam and high-beam functions of the light assembly 20 are housed entirely within the second cavity 28. In other embodiments in which the light assembly 20 is used at the rear of the vehicle 10 of FIG. 1, a brake light, tail light, rear turn signal, or the like may be housed in the second cavity 28 to the same effect. Other lighting devices may be used in the second cavity 28, particularly in non-vehicular applications, or the second cavity 28 may contain non-lighting structure or may be substantially closed supporting structure depending on the design.

The opaque portion 34 serves dual structural functions within the light assembly 20, that is, securing the illuminable outer lens 24 to the housing 32 by essentially acting as an extension of the illuminable outer lens 24, and also preventing or blocking an influx of light (arrows L1) emitted by the first lighting source 42, 142 into the second cavity 28 and vice versa. That is, the illuminable outer lens 24 is positioned so as not to cover the second cavity 28 and to thereby preclude unsatisfactory amounts of light scatter, particularly when using the low-beam function, i.e., the low-beam headlights 22L shown in FIG. 2.

The illuminable outer lens 24 and the opaque portion 34 may be manufactured from a two-shot or three-shot molding process, as is known in the art, due to their different materials, such that the illuminable outer lens 24 and opaque portion 34 are integrally connected together without visible seams. The molding process may include, for example, molding the illuminable outer lens 24 from a mixture of polycarbonate and PEEA in a suitable mold. When the illuminable outer lens 24 has sufficiently cooled and solidified, the mold is adjusted and the opaque portion 34 is molded onto the illuminable outer lens 24. Then, the combined illuminable outer lens 24 and opaque portion 34, the latter effectively now serving the function of a bezel, is connected to the housing 32 at a peripheral bond/glue joint 35 using a two-part epoxy or other suitable material.

Once formed, the opaque portion 34 and the housing 32 may be joined to the low-/high-beam portion shown at 22 in FIG. 1 having its own outer lens 122 of acrylic or other material, such that the opaque portion 34 blocks substantially all of light (arrows L1) from the first lighting cavity 37 from entering the second cavity 28, and vice versa, i.e., with substantially as used here meaning blockage of at least about 95% or more of the light (arrow L1). The edge 13 of the hood 12, when in the closed shown in FIGS. 1 and 2, may be immediately adjacent the opaque portion 34 to provide a desired aesthetic appearance. Collimated light may therefore be selectively emitted from the first cavity 37 without respect to the present lighting status of high-beams, low-beams, or other lighting functions in the second cavity 28, while enabling the design to forgo use of a conventional inner lens and its associated weight and packaging space.

Additionally, the functions which are conductive to the use of the light assembly 20 tend toward those using a clear, transparent lens. While colored lenses such as red brake lights can be configured with the illuminable outer lens 24 described herein, the use of color may render the desired lighting effects as indistinguishable. However, in some designs a clear, transparent lens is used in conjunction with a colored lens, with vehicle backup function being just one example of this. These and other applications may be readily appreciated by one of ordinary skill in the art in view of this disclosure.

As used herein with respect to any disclosed values or ranges, the term "about" indicates that the stated numerical value allows for slight imprecision, e.g., reasonably close to the value or nearly, such as ±10 percent of the stated values or ranges. If the imprecision provided by the term "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A light assembly comprising:
   a housing defining a first cavity and a second cavity, and including an opaque portion;
   an illuminable outer lens constructed from a transparent, homogenous multi-polymer material; and
   a first lighting source positioned within the first cavity, wherein the opaque portion separates the first cavity from the second cavity and prevents an influx into the second cavity of light emitted by the first lighting source;
   wherein the multi-polymer material, when irradiated by the light from the first lighting source, is configured to illuminate with a light transmittance level of at least about 50% and a haze level of not more than about 30%.

2. The light assembly of claim 1, further comprising a second lighting source positioned within the second cavity.

3. The light assembly of claim 2, wherein the light assembly is configured for use as a vehicle headlight assembly, and wherein the second lighting source includes a low-beam headlight and a high-beam headlight of the vehicle headlight assembly.

4. The light assembly of claim 1, wherein the multi-polymer material includes a mixture of polycarbonate and polyetheresteramide (PEEA), and wherein the PEEA constitutes less than about 1% of the illuminable outer lens by weight.

5. The light assembly of claim 4, wherein the PEEA constitutes less than about 0.2% of the illuminable outer lens by weight.

6. The light assembly of claim 1, wherein the first lighting source includes a plurality of light-emitting diodes.

7. The light assembly of claim 6, wherein the first lighting source is a light pipe that includes the plurality of light-emitting diodes.

8. The light assembly of claim 1, further comprising a controller programmed to transmit a lighting control signal to the first lighting device to command activation of the first lighting source.

9. A vehicle comprising:
   a body having a front end;
   a hood positioned at the front end; and
   a light assembly positioned adjacent to the hood and including:
   a housing defining a first cavity and a second cavity, wherein the housing includes an opaque portion;
   an illuminable outer lens constructed from a transparent, homogenous multi-polymer material;
   a first lighting source positioned within the first cavity; and
   a second lighting source positioned within the second cavity, wherein the opaque portion separates the first cavity from the second cavity and prevents an influx into the second cavity of light emitted by the first lighting source;
   wherein the multi-polymer material, when irradiated by the light from the first lighting source, is configured to illuminate with a light transmittance level of at least about 50% and a haze level of not more than about 30%.

10. The vehicle of claim 9, wherein the multi-polymer material includes a mixture of polycarbonate and polyetheresteramide (PEEA), and wherein the PEEA constitutes than about 1% of the illuminable outer lens by weight.

11. The vehicle of claim 10, wherein the PEEA constitutes less than about 0.2% of the illuminable outer lens by weight.

12. The vehicle of claim 9, wherein the first lighting source includes a plurality of light-emitting diodes.

13. The vehicle of claim 12, wherein the first lighting source is a light pipe that includes the plurality of light-emitting diodes.

14. The vehicle of claim 9, further comprising a controller programmed to transmit a control signal to the first lighting device to command activation of the first lighting source, and to thereby provide at least one of a turn signal function, a daytime running light (DRL) function, a park function, and a position function.

15. A light assembly comprising:
   a housing defining a first cavity and a second cavity, wherein the housing includes an opaque portion;
   an illuminable outer lens constructed from a homogenous mixture of at least 99% polycarbonate by weight of the illuminable outer lens and the remainder of the homogenous mixture being polyetheresteramide (PEEA);
   a first lighting source in the form of a plurality of light-emitting diodes (LEDs) positioned within the first lighting cavity, wherein the opaque portion separates the first cavity from the second cavity and prevents an influx into the second cavity of light emitted by the plurality of LEDs;
   a second lighting source in form of a high-beam headlight and a low-beam headlight positioned within the second cavity; and
   a controller programmed to transmit a lighting control signal to the first lighting source to command activation of the first lighting source, and to thereby provide at least one of a turn signal function, a daytime running light (DRL) function, a park function, and a position function;
   wherein the multi-polymer material is configured to illuminate with a light transmittance of at least about 50% and a haze of not more than about 30% when the first lighting source is active.

16. The light assembly of claim 15, wherein the PEEA constitutes less than about 0.2% of the illuminable outer lens by weight.

17. The light assembly of claim 15, wherein the plurality of light-emitting diodes are arranged in an LED light pipe.

* * * * *